(12) United States Patent
Lagares-Greenblatt et al.

(10) Patent No.: US 11,038,774 B2
(45) Date of Patent: Jun. 15, 2021

(54) FACILITATING RECONCILIATION FOR EARLY-ACCESS PROGRAMS

(71) Applicant: INTERNATIONAL BUSINESS MACHINES CORPORATION, Armonk, NY (US)

(72) Inventors: Heidi Lagares-Greenblatt, Jefferson Hills, PA (US); Deirdre H. Duthil, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 397 days.

(21) Appl. No.: 16/166,524

(22) Filed: Oct. 22, 2018

(65) Prior Publication Data

US 2020/0127902 A1 Apr. 23, 2020

(51) Int. Cl.
*H04L 12/24* (2006.01)
*G06Q 10/06* (2012.01)
*G06N 20/00* (2019.01)
*G06Q 30/06* (2012.01)

(52) U.S. Cl.
CPC ......... *H04L 41/5012* (2013.01); *G06N 20/00* (2019.01); *G06Q 10/0631* (2013.01); *H04L 41/5006* (2013.01); *H04L 41/5019* (2013.01); *G06Q 30/06* (2013.01)

(58) Field of Classification Search
CPC ............. H04L 41/5012; H04L 41/5006; H04L 41/5019; G06N 20/00; G06Q 10/0631
USPC .......................................................... 705/30
See application file for complete search history.

(56) References Cited

U.S. PATENT DOCUMENTS

| 7,590,564 B1 * | 9/2009 | Ward ..................... G06Q 10/08 705/26.1 |
| 7,778,882 B2 * | 8/2010 | Chatter .............. G06Q 30/0633 705/26.3 |
| 8,606,911 B2 | 12/2013 | Raleigh |
| 9,179,308 B2 | 11/2015 | Raleigh |
| 2005/0027648 A1 | 2/2005 | Knowles |
| 2005/0189415 A1 * | 9/2005 | Fano ................... G06Q 30/0251 235/383 |

(Continued)

OTHER PUBLICATIONS

Anonymous, "Mechanism for Operational Risk Monitoring, System Testing Optimization and Root Cause Analysis for Complex Applications," IP.com; IPCOM000237767D. Jul. 9, 2014. 18 pages.

(Continued)

*Primary Examiner* — Florian M Zeender
*Assistant Examiner* — Nicole Elena Bruner
(74) *Attorney, Agent, or Firm* — Cantor Colburn LLP; Teddi Maranzano (57) ABSTRACT

A computer-implemented method includes training a cognitive engine to recognize a set of tags in customer data, where the set of tags are associated with one or more early-access programs of one or more products. A first set of customer data associated with a first instance of a first early-access program is submitted to the trained cognitive engine, where the first instance is associated with a customer and a first product. A plurality of data packets associated with the tags are received from the trained cognitive engine, responsive to the first set of customer data. The first instance of the first early-access program is reconciled based at least in part on the plurality of data packets.

14 Claims, 3 Drawing Sheets

(56) References Cited

U.S. PATENT DOCUMENTS

| | | | | |
|---|---|---|---|---|
| 2008/0103919 A1* | 5/2008 | Leach | ............... | G06Q 30/0641 |
| | | | | 705/27.1 |
| 2010/0023921 A1* | 1/2010 | Chaar | ................... | G06Q 10/06 |
| | | | | 717/102 |
| 2014/0249965 A1* | 9/2014 | Syed | ................. | G06Q 30/0635 |
| | | | | 705/26.81 |
| 2015/0163694 A1 | 6/2015 | Raleigh | | |
| 2015/0302498 A1* | 10/2015 | Barton | ............ | G06Q 10/08345 |
| | | | | 705/26.4 |

OTHER PUBLICATIONS

Anonymous, "Methodology for Cognitive Security Applied to Automated Agent Capability," IP.com; IPCOM000248604D. Dec. 21, 2016. 6 pages.

Authors: Microsoft, Bar Lockwood, "Enterprise Data Set Modeling Tool," IP.com; IPCOM000230646D. Aug. 29, 2013. 7 pages.

\* cited by examiner

FACILITATING RECONCILIATION FOR EARLY-ACCESS PROGRAMS

BACKGROUND

The present invention relates to early-access programs and, more specifically, to facilitating reconciliation for early-access programs.

An early-access program is a program under which customers are able to access, and generally utilize, some aspects of a product prior to general availability (GA) to the public. Such products often include a computer system or a portion of a computer system, such as software, firmware, hardware, or combinations of these. An early-access program can be a beta program, early support program, early ship program, early access, prerelease, tryout, early adopter program, or various other programs in which a system is provided ahead of general availability.

When a customer joins an early-access program offered by an organization, an agreement is involved. The agreement outlines the terms of the program, including what will be provided by the organization, and whether and how much the customer is expected to pay at the conclusion of the early-access program. Additionally, the agreement typically includes a set of dates, such as the beginning of the early-access program, the date of general availability, and the date which reconciliation is expected to be complete. The agreement can indicate whether the customer is making a commitment to buy the system upon general availability and may also provide a pricing model. However, the customer is not always committing to buy, such as in the case of a try-and-buy or loaner program, and thus a pricing model is not always applicable.

These agreements can take many forms, depending on the customer and the relationship between the customer and the organization running the early-access program. In some cases, the agreement is a formal document. In other cases, however, the agreement is in the form of one or more messages, an electronic transaction, or other documents or recorded events. In either case, this is typically not an agreement based on a template, but rather, each agreement is specifically crafted for the customer.

When an early-access program begins, the organization offering the program places an order for the system in question on behalf of a customer. If this were a standard order, the customer would likely place the order, and the customer would pay for the order. However, with an early-access program, the system in question does not yet meet minimum ship level (MSL) and thus cannot be charged like a standard order. The customer likely does not pay until after the product enters a GA phase. Thus, the organization places the order and pays for the order to maintain appropriate records.

Later, during reconciliation, a final order is placed by the client or on behalf of the client, utilizing the client's funds. This final order enables the organization to recognize revenue from the sale. Part of the reconciliation process involves matching up a pre-GA order with a corresponding GA order, such that it is understood that only a single product was delivered to the customer, despite the existence of two orders.

Reconciliation can involve other tasks as well, such as ensuring that the customer's system meets minimum ship level (MSL), ensuring that appropriate components are included if additional components are being added to the system, cleaning up records related to the customer, moving any warranty start date to a date that aligns with general availability, ensuring that all requirements of the agreement are met, and ensuring that requirements are met related to any business partner through which the customer is purchasing the system. Generally, reconciliation ensures that the customer can utilize the system in a standard way, without any issues remaining from the early-access program.

SUMMARY

Embodiments of the present invention are directed to a computer-implemented method for facilitating reconciliation. A non-limiting example of the computer-implemented method includes training a cognitive engine to recognize a set of tags in customer data, where the set of tags are associated with one or more early-access programs of one or more products. A first set of customer data associated with a first instance of a first early-access program is submitted to the trained cognitive engine, where the first instance is associated with a customer and a first product. A plurality of data packets associated with the tags are received from the trained cognitive engine, responsive to the first set of customer data. The first instance of the first early-access program is reconciled based at least in part on the plurality of data packets.

Embodiments of the present invention are directed to a system for facilitating reconciliation. A non-limiting example of the system includes a memory having computer-readable instructions and one or more processors for executing the computer-readable instructions. The computer-readable instructions include training a cognitive engine to recognize a set of tags in customer data, where the set of tags are associated with one or more early-access programs of one or more products. Further according to the computer-readable instructions, a first set of customer data associated with a first instance of a first early-access program is submitted to the trained cognitive engine, where the first instance is associated with a customer and a first product. A plurality of data packets associated with the tags are received from the trained cognitive engine, responsive to the first set of customer data. The first instance of the first early-access program is reconciled based at least in part on the plurality of data packets.

Embodiments of the invention are directed to a computer-program product for facilitating reconciliation, the computer-program product including a computer-readable storage medium having program instructions embodied therewith. The program instructions are executable by a processor to cause the processor to perform a method. A non-limiting example of the method includes training a cognitive engine to recognize a set of tags in customer data, where the set of tags are associated with one or more early-access programs of one or more products. Further according to the method, a first set of customer data associated with a first instance of a first early-access program is submitted to the trained cognitive engine, where the first instance is associated with a customer and a first product. A plurality of data packets associated with the tags are received from the trained cognitive engine, responsive to the first set of customer data. The first instance of the first early-access program is reconciled based at least in part on the plurality of data packets.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the reconciliation process for early-access programs is convoluted and error prone. Because not all agreements are the same, or even take the same form, there is no existing way to automatically determine the requirements of an agreement applicable to an early-access program or to ensure those requirements are met. Additionally, there is usually pressure to complete reconciliation quickly, so as to recognize revenue for the sale.

Turning now to an overview of the aspects of the invention, one or more embodiments of the invention address the above-described shortcomings of the prior art by providing a mechanism to dynamically assist a user in determining what tasks must be performed during reconciliation and to automatically perform some of such tasks. In some embodiments of the invention, a cognitive engine is trained on past early-access programs to recognize critical information in customer data, regardless of the form of that customer data. As such, the cognitive engine can be applied to current customer data to identify this critical information, which can include important dates and requirements that are necessary for the reconciliation process. With this information, embodiments of the invention can automate some aspects of the reconciliation process and can provide guidance with respect to others.

The above-described aspects of the invention address the shortcomings of the prior art by providing an improved reconciliation system that can be largely or fully automated to reconcile data associated with an early-access program Through machine learning, involving training and utilizing a cognitive engine, customer data can be used to facilitate reconciliation in a way that is more efficient and potentially more accurate, as compared to existing reconciliation methods.

Figure 1:
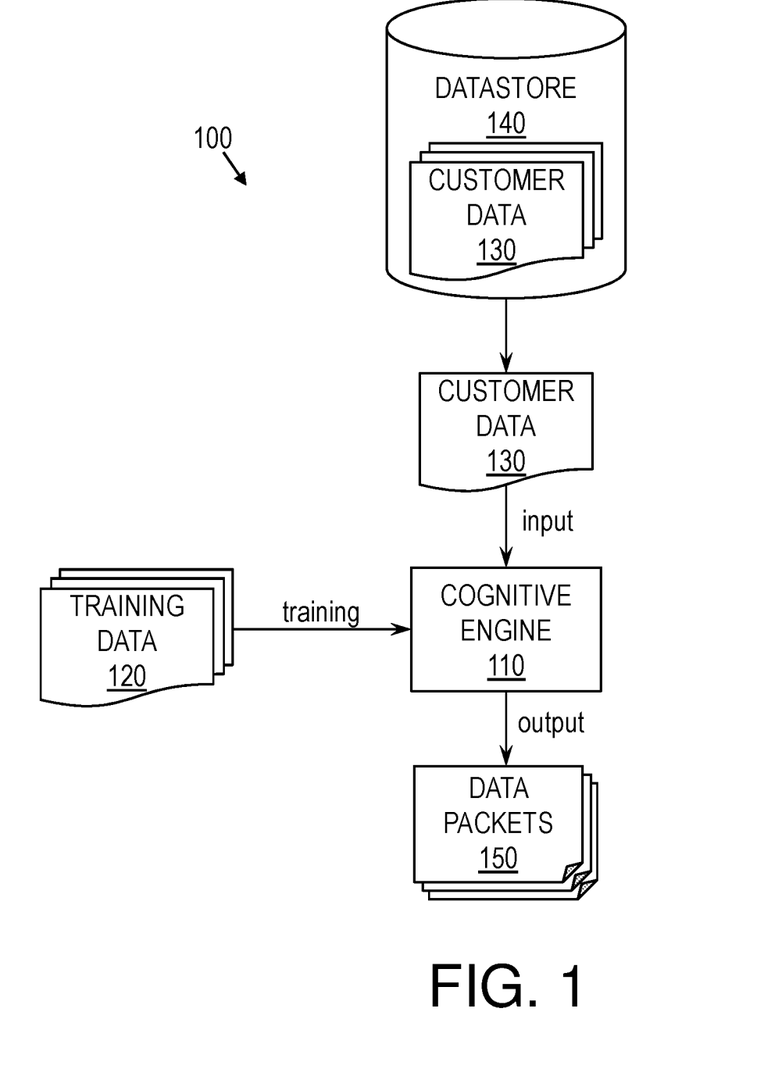
FIG. 1 is a reconciliation system for reconciling instances of early-access programs, according to some embodiments of the invention.

Turning now to a more detailed description of aspects of the present invention, FIG. 1 is a reconciliation system 100 for reconciling instances of early-access programs, according to some embodiments of the invention. As shown in FIG. 1, in some embodiments of the invention, the reconciliation system 100 includes a cognitive engine 110, which learns based on training data 120 to identify data associated with predefined tags. After training, the cognitive engine 110 may access customer data 130 in a datastore 140 and may output data packets 150, each of which includes information associated with a tag. The datastore 140 may include one or more databases, files, or other storage objects and may maintain records associated with early-access programs of an organization. The customer data 130 may include, for example, messages between a customer and the organization, financial data associated with the customer, or data describing parts of the agreement applicable to the customer.

Additionally or alternatively, in some embodiments of the invention, the customer contributes to the generation of data packets 150 by identifying one or more terms of the customer's agreement. This identification by the customer may occur at various times prior to the completion reconciliation, such as upon originally accepting the terms or upon automated request from the reconciliation system 100. Such terms may be specific to the customer and may include the following, for example, and not by way of limitation: whether there is a commitment to buy; pricing model, if applicable; warranty details; warranty start date; product ship date; shipped version or level; minimum ship level upon general availability; or other terms. The reconciliation system 100 may then encapsulate each such identified term into a data packet 150 useable as described below.

The information in the data packets 150 may be used to perform reconciliation in a manner that is manual, automated, or a combination of both. These operations will be described in more detail below.

In some embodiments of the invention, the reconciliation system 100 learns from experience with past reconciliations, and as a result, the reconciliation system 100 can recognize financial trails and other critical information in customer data 130. In some embodiments of the invention, the reconciliation system 100 utilizes a dynamic process that assists a user to complete the reconciliation process of an early-access program. To this end, the reconciliation system 100 may dynamically analyze the terms of agreements to make sure the reconciliation process complies with applicable terms. In some embodiments of the invention, the cognitive engine 110 of the reconciliation system is or uses a predictive engine, such as one included in International Business Machines® Watson®, that can create insights about the agreed conditions, create data packets 150 based on special tags associated with attributes, collect data from various services, analyze that data against agreements, change statuses so as to update tags, and trigger reconciliation events.

Figure 2:
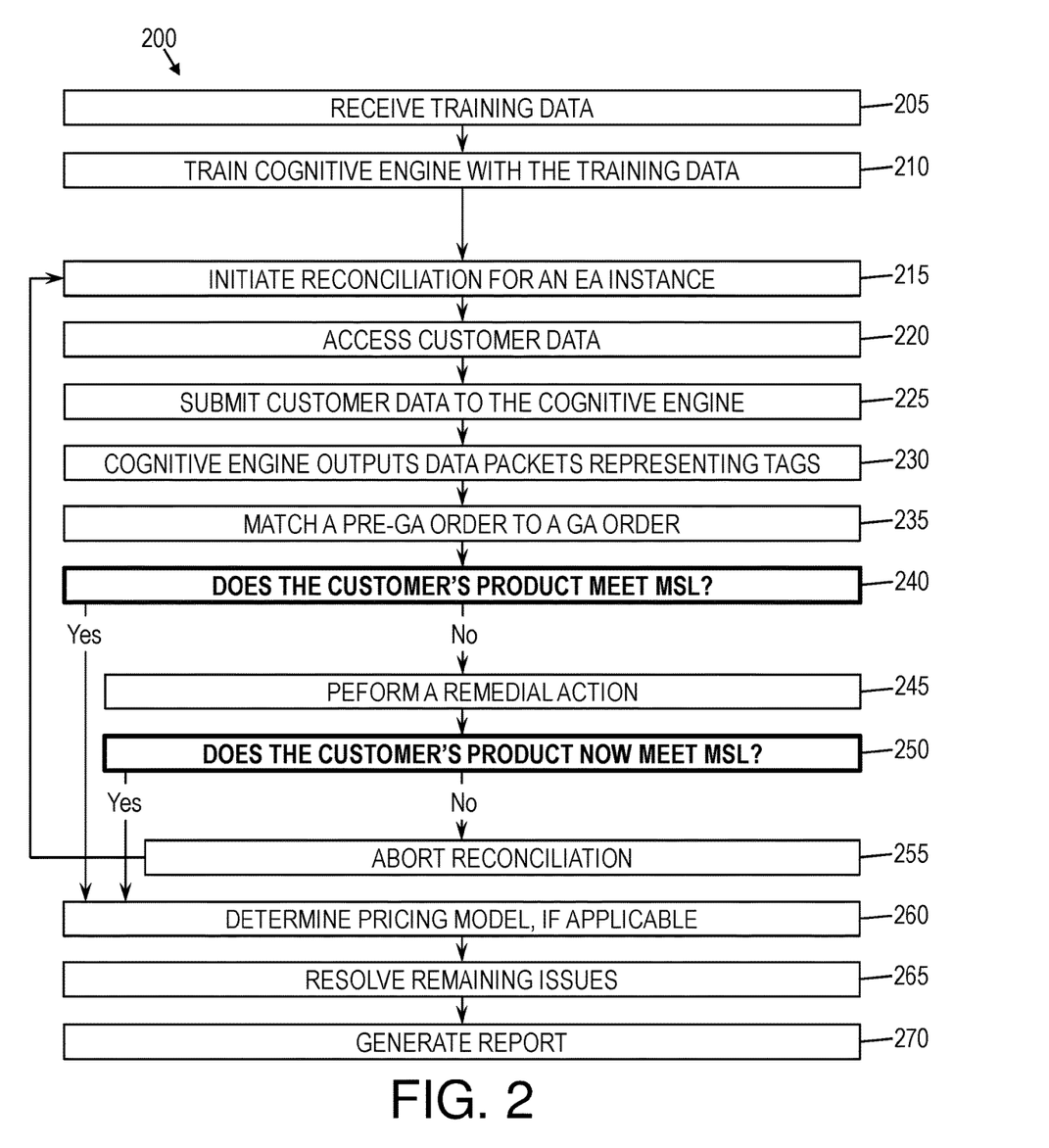
FIG. 2 is a flow diagram of a method of reconciling instances of early-access programs, according to some embodiments of this invention.

FIG. 2 is a flow diagram of a method 200 of reconciling instances of early-access programs, according to some embodiments of this invention. At block 205, training data 120 may be received to train the cognitive engine 110. The training data 120 may include past customer data 130 with labels, where information corresponding to one or more tags is labeled in the customer data 130. For instance, each set of past customer data 130 may represent an early-access (EA) instance. For the purposes of this disclosure, an EA instance relates to a specific instance of an early-access program, ruled by a specific agreement. The agreement need not be embodied in a single written agreement but, rather, may alternatively be made up of messages or smaller agreements combined together. An EA instance may involve a specific customer, a specific organization, and a specific product.

In the training data 120, each set of customer data 130 may relate to a past EA instance, which is an EA instance for which reconciliation has already been performed. The products represented in the past EA instances may vary from one EA instance to the next, and various early-access programs may be represented as well. In some embodiments of the invention, each product represented in a past EA instance is hardware or software, such as firmware, or a combination of hardware and software. Each set of customer data 130 in the training data 120 may include, for example, and not by way of limitation, agreement data representing the applicable agreement, financial data associated with the respective EA instance, communication data representing communication related to the EA instance, or various other data associated with the respective past instance of an early-access program.

As mentioned above, in the training data 120, information in the customer data 130 may be labeled with tags. Each tag may be part of a pre-established set of tags, which are defined for the purpose of extracting certain information. The set of tags may be preestablished, for example, manually, to describe critical data in the reconciliation process, including critical terms of applicable agreements. For example, and not by way of limitation, a tag may be established for each of the following: the GA date, the pre-GA order, the GA order, the required reconciliation date, whether there is a commitment to buy, pricing model, warranty details, warranty start date, product ship date, shipped version or level, minimum ship level upon general availability, or other aspects of an applicable agreement. The customer data 130 may be labeled, such that, for a tag, a portion of the past customer data 130 is associated with that tag and, thus, labeled with the tag. More specifically, for instance, in some embodiments of the invention, the training data 120 includes labeled references to portions of the past customer data 130, where each label is associated with a tag and each reference indicates a portion of the customer data 130. Thus, the training data 120 includes data couples, each of which includes a reference to a portion of the customer data 130 and a respective tag in the set of established tags. For instance, in the case of a tag representing the GA date, the string "GA date" or another indication of the tag may be coupled with a location of the GA data in a set of customer data 130. It will be understood that not all EA instances necessarily include information corresponding to every tag. However, in some embodiments of the invention, each set customer data 130 in the training data 120 may be labeled with one or more tags.

At block 210, the cognitive engine 110 may be trained with the training data 120. The cognitive engine 110 may be, or may include, one or more of various predictive engines, such as, for example, a neural network, a decision tree, or a random forest. One of skill in the art will understand how to train such a predictive engine, given the training data 120. After training, the cognitive engine 110 may be capable of receiving as input unlabeled customer data 130 and may thus determine labels for that customer data 130. In other words, the cognitive engine 110 may be capable of identifying information corresponding to the tags.

In some embodiments of the invention, blocks 205-210 describe training the cognitive engine 110, which is an initialization activity for performing reconciliation. The operations of these blocks need only be performed once for the reconciliation system 100. However, the training data 120 may be occasionally updated with new sets of customer data 130, new tags, or modified labels, and in that case, the cognitive engine 110 may be retrained as needed. The remaining blocks of this method 200, specifically blocks 215 through 265, describe operations that may be performed for each EA instance.

As shown in FIG. 2, at block 215, reconciliation is initiated. Specifically, reconciliation may be initiated for one or more current EA instances, where each current EA instance is an EA instance that has not yet been reconciled. Various events may trigger the reconciliation. For instance, in some embodiments of the invention, reconciliation is triggered based on the GA date. For example, and not by limitation, the reconciliation system 100 may automatically begin reconciliation on the GA date of a product for the set of current EA instances involving the product. For another example, the reconciliation system 100 may automatically begin reconciliation a fixed number of days prior to the planned GA date. The reconciliation system 100 may detect environmental information, such as the current date, and may detect the GA date of each product based on information in the datastore 140. Thus, the reconciliation system 100 may initiate reconciliation automatically.

In some embodiments of the invention, reconciliation applies to each EA instance individually. In other words, the reconciliation process described in blocks 215 through 265 of the method 200 herein may be performed for each customer and for each product for which the customer participated in an early-access program. In some embodiments of the invention, however, reconciliation may be triggered for each product, for instance, based on the GA date of that product, and then reconciliation may proceed for each EA instance related to that product.

At block 220, after reconciliation has begun for a particular EA instance, the reconciliation system 100 may access the customer data 130 related to that instance. For example, this customer data 130 may be received as input, or the reconciliation system 100 may access the customer data 130 in the datastore 140. In some embodiments of the invention, the reconciliation system 100 automatically recognizes customer data 130 that is associated with the customer and may thus identify and utilize that customer data 130 in the datastore 140. For instance, each customer may be associated with a customer identifier, such as the customer name or a customer reference number, and each product may be associated with a product identifier, such as a product name or product reference number. The reconciliation system 100 may search the datastore 140 for all records having both a customer identifier associated with the customer of the EA instance and a product identifier associated with the product of the EA instance. A record may be various types of data, such as a formal agreement, a message, or various other data in the datastore 140. These records may be compiled together to form the customer data 130 for the EA instance.

At block 225, the reconciliation system 100 may submit the customer data 130 to the cognitive engine 110. At block 230, based on its prior training, the cognitive engine 110 may output information corresponding to the tags. For instance, the cognitive engine 110 may output a set of data packets 150, with each data packet 150 representing one or more tags. Such a data packet 150 may include a data couple, including an indication of a particular tag and a reference to a portion of the customer data 130 that corresponds to the tag. Additionally or alternatively, in some embodiments of the invention, the customer explicitly identifies its own terms to the reconciliation system 100, and each such term is encapsulated into a data packet 150 for later use as described herein.

It will be understood that not all tags are necessarily present in the customer data 130, and thus the cognitive engine 110 need not provide a data couple for each tag. Rather, tags for which corresponding information, also referred to as matching information, is not identified need not be represented in the output data packets 150.

In some embodiments of the invention, the reconciliation system 100 may output the data packets 150 to the user, such as by displaying a table of the data couples. As a result, the user can see which information in the customer data 130 matches the tags. In some embodiments of the invention, this provides to the user a view of critical information related to the EA instance, as the tags may have been selected for identification of critical information.

At block 235, the data packets 150 may be used to match a pre-GA order to a GA order. According to some embodiments of the invention, a pre-GA order is an order placed as part of an early-access program and is thus dated during the early-access program to enable participation in the early-access program, while GA is a standard order and may thus be dated on or around the GA date. Various mechanisms may be used to match the pre-GA order of the EA instance to the GA orders, and it will be understood that the particular mechanisms used may vary across EA instances as well as across embodiments of the invention.

In some embodiments of the invention, the set of tags upon which the cognitive engine 110 was trained may include a respective tag for each of the pre-GA order and the GA order. The cognitive engine 110 may therefore have been trained to recognize indications of these orders in the customer data 130. As such, the data packets 150 output by the cognitive engine 110 may include a reference to the pre-GA order, the GA order, or both. In that case, matching a pre-GA order with a GA order may include using orders recognizes by the cognitive engine 110. If the cognitive engine 110 recognizes both the pre-GA order and the GA order, then these orders may be matched. If the cognitive engine 110 recognizes one but not the other, then the recognized order may be used and the reconciliation system 100 may seek the other order for matching.

In some embodiments of the invention, the reconciliation system 100 may search the datastore 140 for orders associated with the customer and the product. Typically, each order is associated with a customer identifier, which identifies the customer for whom the order was placed. Thus, identifying orders associated with the customer and the product may be performed by searching the datastore 140 for orders including both the customer identifier and the product identifier. Of such orders, the reconciliation system 100 may seek to identify a pre-GA order, which may be dated during the EA program, or a GA order, which may be dated on or around the GA date. If the cognitive engine 110 identifies the pre-GA order, the reconciliation system 100 need not make a further attempt to identify the pre-GA order, and analogously, if the cognitive engine 110 identifies the GA order, the reconciliation system 100 need not make a further attempt to identify the GA order.

Upon identifying orders that are candidates for the pre-GA order of the GA order, the reconciliation system 100 may look for a similarity in such orders. Typically, the pre-GA order and the GA order will be for the same configuration of the product, for instance. In some embodiments of the invention, the reconciliation system 100 may identify a set of candidate pre-GA orders and a set of candidate GA orders, where each such set may include one or more orders. The candidate pre-GA orders may include all not-yet-matched pre-GA orders for the product that are either associated with the customer identifier or are associated with no recognizable customer identifier. The candidate GA orders may include all not-yet-match GA orders for the product that are either associated with the customer identifier or are associated with no recognizable customer identifier. The reconciliation system 100 may then select a pre-GA from among the candidate pre-GA orders and a GA order from among the candidate GA orders. For instance, this may be done by generating a similarity score between each pair of candidate pre-GA order and candidate GA order. Then the reconciliation system 100 may present the scored pairs to the user for selection of a matching pair, or the reconciliation system 100 may select among the pairs. For example, and not by way of limitation, the reconciliation system 100 may select the pair with the highest similarity score such that at least one of the candidate pre-GA order and the candidate GA order include the customer identifier of the customer.

For another example, if the GA order has not yet been placed, the reconciliation system 100 may instruct the customer to place the GA order with specific attributes (e.g., customer identifier, system configuration, order date), such that the GA order exactly or closely matches the pre-GA order known to have been placed for this EA instance. In that case, after placement of such order, the reconciliation system 100 may recognize the GA order based on the specific attributes and may thus match the GA order to the pre-GA order.

At decision block 240, it may be determined whether the customer's product is at MSL. Specifically, for instance, the product may include various components, such as one or more software packages and one or more hardware parts. In some embodiments of the invention, each of such components should be at the minimum ship level in order for the product as a whole to be considered minimum ship level.

For example, and not by way of limitation, each component of the product may be associated with a version, and the reconciliation system 100 may have access to a database table, or other form of data storage, that indicates the minimum version of each component that constitutes the MSL. Thus, the reconciliation system 100 may communicate with the customer's product, such as over the internet, to determine the version of each component of the product. If all such components meet MSL, then the product may be deemed to meet MSL. However, in some embodiments of the invention, if even a single component does not meet MSL, then the product does not meet MSL. If the product meets MSL, then the method 200 may proceed with the reconciliation process at block 260.

If the product does not meet MSL, then at block 245, the reconciliation system 100 may take a remedial action in an attempt to bring the product to MSL. The remedial action may be dependent on the type of component that does not meet MSL. For example, and not by way of limitation, if the component is a software component, the reconciliation system 100 may automatically initiate an upgrade to a version that meets MSL, the reconciliation system 100 may automatically communicate with the customer that an upgrade is needed, or the reconciliation system 100 may notify a user of the issue so that the user can notify the customer of required steps. For another example, if the component is a hardware part that requires replacement to reach MSL, then the reconciliation system 100 may notify a user of the needed replacement, or may automatically place the order for the required hardware part.

At decision block 250, it may be determined whether the remedial action brought the product up to MSL. This may be the case, for example, if the reconciliation system 100 was able to remotely upgrade the product in a way that brought the product to MSL. Alternatively, for example, if an upgraded hardware part was needed, then ordering that part did not itself bring the product up to MSL. If the product does not yet meet MSL, then the method may abort at block 255, to be restarted after the product has been raised to MSL. However, if the product now meets MSL, then the method 200 may proceed with the reconciliation process at block 260.

At block 260, the pricing model for the product may be determined, if applicable. This determination may be based on the output of the cognitive engine 110, which may have recognized data corresponding to a tag for the pricing model. From the pricing model, the actual price of the product may be determined. It will be understood, however, that not all EA instances are associated with a purchase or an expected purchase, and thus it may be the case that no pricing model applies. In this case, the fact that no pricing model is applicable may be determined.

At block 265, remaining issues may be resolved. For example, and not by way of limitation, these issues may relate to, for example, pricing, warranty status, technical support, and system records.

For instance, the pricing model may have been determined above. Based on the pricing model and other relevant information, such as the product configuration, the price payable by the customer may be determined. If necessary, the reconciliation system 100 may then automatically bill the customer for this price. If the warranty is currently running from the pre-GA order, the reconciliation system 100 may update the warranty to begin on GA date or on the date on which the GA order for the product was placed. If any technical support issues are outstanding according to records in the customer data 130, those may be handled as needed. Further, any notes in the customer's record with the organization with respect to the product may be cleared, as those notes will typically refer to the early-access version of the product.

At block 270, the reconciliation system 100 may generate a report of reconciliation activities for the EA instance. For example, and not by way of limitation, the report may indicate the various activities performed by the reconciliation system 100 for the EA instance, as well as any warnings that didn't cause the process to fail but may be issues nonetheless. A user may utilize the report to confirm that the reconciliation process was performed successfully or to address any outstanding issues. In some embodiments of the invention, the report may be an aggregated report that includes information about various EA instances, such as a group of EA instances for various customers and a common product.

Figure 3:
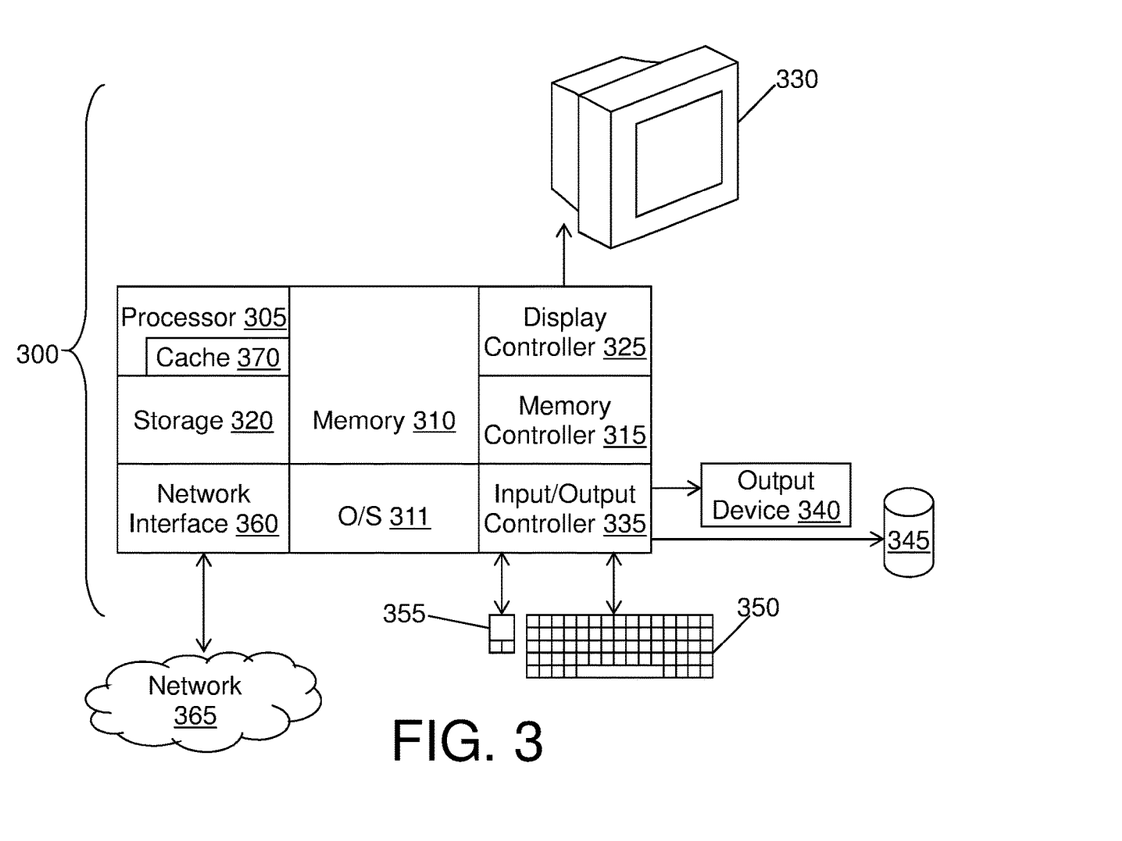
FIG. 3 is a block diagram of a computer system for implementing some or all aspects of the reconciliation system, according to some embodiments of this invention.

FIG. 3 is a block diagram of a computer system 300 for implementing some or all aspects of the reconciliation system 100, according to some embodiments of this invention. The reconciliation systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335.

These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the reconciliation systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Reconciliation systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    training, by a processor, a cognitive engine to recognize a set of tags in training data, the training data comprising past customer data, wherein the set of tags are associated with one or more early-access programs of one or more products;
    submitting, by a processor, to the trained cognitive engine a first set of customer data from a datastore, the first set of customer data associated with a first instance of a first early-access program, wherein the first instance is associated with a customer and a first product;
    receiving, by a processor, from the trained cognitive engine a plurality of data packets associated with the set of tags, responsive to the first set of customer data; and
    reconciling, by a processor, the first instance of the first early-access program based at least in part on the plurality of data packets, wherein the reconciling the first instance of the first early-access program based at least in part on the plurality of data packets comprises:
        determining a general-availability (GA) order associated with the customer and the first product;
        determining a pre-GA order associated with the customer and the first product, wherein the pre-GA order matches the GA order; and
        shifting a warranty date of the first product based on the GA order.

2. The computer-implemented method of claim 1, wherein the reconciling the first instance of the first early-access program based at least in part on the plurality of data packets further comprises determining whether the first product meets a minimum ship level.

3. The computer-implemented method of claim 1, wherein the training the cognitive engine to recognize the set of tags in the customer data comprises:
    receiving a plurality of sets of labeled past customer data, wherein the plurality of sets of labeled past customer data comprise a set of data couples, and wherein each data couple comprises an indication of a tag, in the set of tags, and a reference to a respective portion of the plurality of sets of labeled past customer data.

4. The computer-implemented method of claim 3, wherein the plurality of data packets comprise, for each tag in the set of tags, a reference to a portion of the first set of customer data that corresponds to the tag.

5. The computer-implemented method of claim 1, further comprising automatically initiating reconciliation of the first instance of the first early-access program based on a general-availability date of the first product.

6. A system comprising:
a memory having computer-readable instructions; and
one or more processors for executing the computer-readable instructions, the computer-readable instructions comprising instructions for:
training a cognitive engine to recognize a set of tags in training data, the training data comprising past customer data, wherein the set of tags are associated with one or more early-access programs of one or more products;
submitting to the trained cognitive engine a first set of customer data from a datastore, the first set of customer data associated with a first instance of a first early-access program, wherein the first instance is associated with a customer and a first product;
receiving from the trained cognitive engine a plurality of data packets associated with the set of tags, responsive to the first set of customer data; and
reconciling the first instance of the first early-access program based at least in part on the plurality of data packets, wherein the reconciling the first instance of the first early-access program based at least in part on the plurality of data packets comprises:
determining a general-availability (GA) order associated with the customer and the first product;
determining a pre-GA order associated with the customer and the first product, wherein the pre-GA order matches the GA order; and
shifting a warranty date of the first product based on the GA order.

7. The system of claim 6, wherein the reconciling the first instance of the first early-access program based at least in part on the plurality of data packets further comprises determining whether the first product meets a minimum ship level.

8. The system of claim 6, wherein the training the cognitive engine to recognize the set of tags in the customer data comprises:
receiving a plurality of sets of labeled past customer data, wherein the plurality of sets of labeled past customer data comprise a set of data couples, and wherein each data couple comprises an indication of a tag, in the set of tags, and a reference to a respective portion of the plurality of sets of labeled past customer data.

9. The system of claim 8, wherein the plurality of data packets comprise, for each tag in the set of tags, a reference to a portion of the first set of customer data that corresponds to the tag.

10. The system of claim 6, the computer-readable instructions further comprising instructions for automatically initiating reconciliation of the first instance of the first early-access program based on a general-availability date of the first product.

11. A computer-program product for facilitating reconciliation, the computer-program product comprising a computer-readable storage medium having program instructions embodied therewith, the program instructions executable by a processor to cause the processor to perform a method comprising:
training a cognitive engine to recognize a set of tags in training data, the training data comprising past customer data, wherein the set of tags are associated with one or more early-access programs of one or more products;
submitting to the trained cognitive engine a first set of customer data from a datastore, the first set of customer data associated with a first instance of a first early-access program, wherein the first instance is associated with a customer and a first product;
receiving from the trained cognitive engine a plurality of data packets associated with the set of tags, responsive to the first set of customer data; and
reconciling the first instance of the first early-access program based at least in part on the plurality of data packets, wherein the reconciling the first instance of the first early-access program based at least in part on the plurality of data packets comprises:
determining a general-availability (GA) order associated with the customer and the first product;
determining a pre-GA order associated with the customer and the first product, wherein the pre-GA order matches the GA order; and
shifting a warranty date of the first product based on the GA order.

12. The computer-program product of claim 11, wherein the reconciling the first instance of the first early-access program based at least in part on the plurality of data packets further comprises determining whether the first product meets a minimum ship level.

13. The computer-program product of claim 11, wherein the training the cognitive engine to recognize the set of tags in the customer data comprises:
receiving a plurality of sets of labeled past customer data, wherein the plurality of sets of labeled past customer data comprise a set of data couples, and wherein each data couple comprises an indication of a tag, in the set of tags, and a reference to a respective portion of the plurality of sets of labeled past customer data.

14. The computer-program product of claim 13, wherein the plurality of data packets comprise, for each tag in the set of tags, a reference to a portion of the first set of customer data that corresponds to the tag.

* * * * *